(No Model.)
A. M. WHITE.
COMPOSING STICK.
No. 418,858. Patented Jan. 7, 1890.
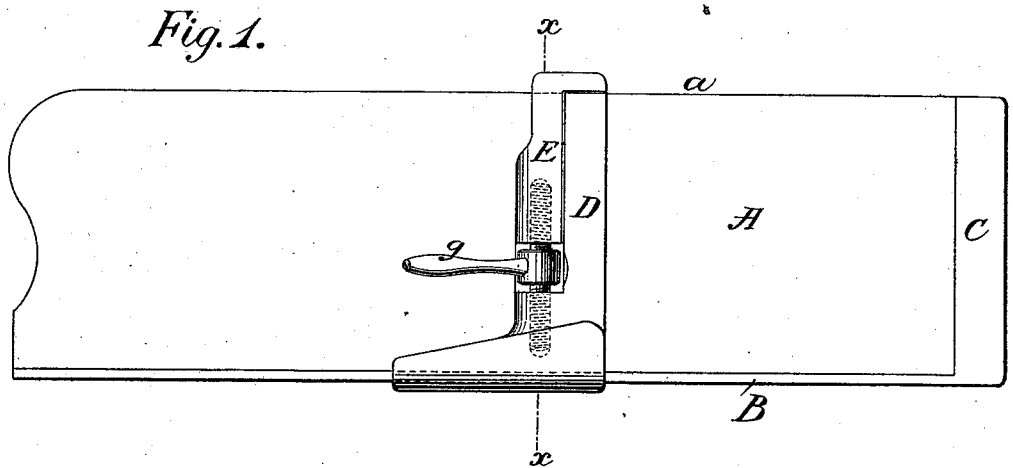
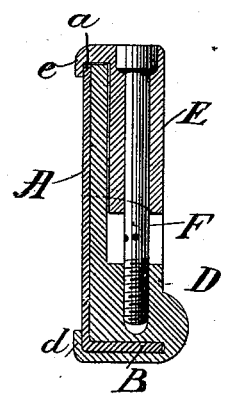
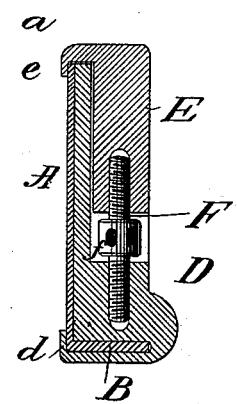
Witnesses:-
D. H. Haywood
C. L. Sundgren
Inventor:-
Albert M. White
by attorneys
Brown & Griswold

UNITED STATES PATENT OFFICE.

ALBERT M. WHITE, OF WATERBURY, CONNECTICUT.

COMPOSING-STICK.

SPECIFICATION forming part of Letters Patent No. 418,858, dated January 7, 1890.

Application filed May 27, 1889. Serial No. 312,215. (No model.)

*To all whom it may concern:*

Be it known that I, ALBERT M. WHITE, a citizen of the United States, residing at Waterbury, in the county of New Haven and State of Connecticut, have invented a new and useful Improvement in Printers' Composing-Sticks, of which the following is a specification, reference being had to the accompanying drawings.

The object of this invention is to afford facility for the adjustment and securing of the slide upon the body of the stick, according to the width of column of type to be composed in a stick.

I will now proceed to describe my invention with reference to the accompanying drawings, and afterward point out its novelty in claims.

Figure 1 is a face view of a composing-stick constructed according to my invention. Fig. 2 represents a transverse section in the line *x x* of Fig. 1. Fig. 3 represents a transverse section corresponding with Fig. 2, but illustrating a modification of the invention.

Similar letters of reference designate corresponding parts in all the figures.

A B C designate the body of the stick, A being the bottom, B the longitudinal flange, and C the end.

D E designate the adjustable slide, consisting of two pieces, of which one piece D constitutes the adjustable side of the stick and one member of the clamp, and the other piece E constitutes the other member of the clamp. The piece D fits close against the face of the bottom A, and is grooved, as shown in the sectional views, Figs. 2 and 3, to receive the flange B, and is formed with a lip *d*, which overlaps the bottom A of the body. The other piece E is fitted to slide on D in a direction transverse to the bottom A, and is made with a lip *e*, which overlaps the front edge *a* of the bottom A, as shown in Figs. 2 and 3.

F designates a screw by which the two pieces D and E are connected together in such manner as to be capable of drawing them together for the purpose of making them clamp opposite sides of the bottom A— that is to say, the flange B and the opposite edge *a*.

In the example shown in Fig. 2 the screw F is a double screw, consisting of a right-hand and a left-hand screw, one of which screws into a tapped hole in the piece D and the other into a tapped hole in the piece E, and united by a head *f*, which is situated between the two pieces D and E, and in which are holes for the reception of a short lever *g*, by which to turn the screw for the purpose of clamping and unclamping the clamp formed by the pieces D E upon the opposite edges of the stick.

In the example shown in Fig. 3 the screw has but a single thread, having a head at one end, which is countersunk into the piece E, and the thread at or near the other end of which screws into the tapped hole in the piece D, the head and that part of the shank of the screw which fits the piece E being capable of turning freely therein. This screw may be turned to cause the clamping and releasing of the slide D E upon the sides of the body by a lever, like *g*, inserted in holes in that part of the shank which is exposed between the pieces D and E.

In either of the two examples the screw serves to draw the two parts D E of the slide together and make them clamp the opposite sides of the body. In the example shown in Figs. 1 and 2 the screw always serves to force the clamp open; but in the example shown in Fig. 3 the screw will only release the pressure of the clamp and leave it free to open sufficiently to permit the slide D E to move upon the body.

The important feature of this invention is that the slide is clamped upon both sides B and *a* of the body of the stick.

What I claim as my invention, and desire to secure by Letters Patent, is—

1. The combination, with the body of a composing-stick, of the slide composed of two clamping members receiving between them the opposite sides or edges of the body, and a screw connecting the said clamping members for causing them to clamp the said opposite sides or edges, substantially as and for the purpose specified.

2. The combination, with the body of the stick, of the slide consisting of two members, the first of which constitutes the movable side of the stick and is fitted to the longitudinal flange of the body, and the second of which slides upon the first one and is fitted to that side or edge of the stick opposite the flange, and a right and left hand screw screwing into the said two members for the purpose of making them clamp and unclamp the opposite sides or edges of the body, substantially as herein set forth.

3. The combination, with the body of the composing-stick, of the sliding piece D, fitted to the face of the body and to one side or edge thereof, the piece E, fitted to slide on the piece D and on the opposite side or edge of the body, and the screw F, connecting the said pieces together and serving to produce their clamping action on the opposite sides or edges of the body, substantially as herein set forth.

ALBERT M. WHITE.

Witnesses:
C. J. GRIGGS,
CHAS. W. GILLETTE.